(12) United States Patent  R C et al.

(10) Patent No.: US 12,591,438 B2
(45) Date of Patent: Mar. 31, 2026

(54) CONFIGURATION TRANSPORT BETWEEN TENANTS

(71) Applicant: SAP SE, Walldorf (DE)

(72) Inventors: Naveen Kumar R C, Bangalore (IN); Prabir Kumar Mallick, Bangalore (IN); Anupam Das, Bangalore (IN); Balajee Bhaskaran, Bangalore (IN)

(73) Assignee: SAP SE, Walldorf (DE)

( * ) Notice: Subject to any disclaimer, the term of this patent is extended or adjusted under 35 U.S.C. 154(b) by 140 days.

(21) Appl. No.: 18/462,631

(22) Filed: Sep. 7, 2023

(65) Prior Publication Data

US 2025/0085978 A1     Mar. 13, 2025

(51) Int. Cl.
*G06F 9/4401* (2018.01)

(52) U.S. Cl.
CPC .................................. *G06F 9/4416* (2013.01)

(58) Field of Classification Search
CPC .... G06F 9/4416; G06F 9/4411; G06F 9/4401; G06F 3/067; H04L 67/14; H04L 41/0846; G06N 3/09; G06N 3/045; G06N 20/10
USPC .......... 707/609, 665, 667, 695, 758, 17.005, 707/17.032; 709/220, 222, 223
See application file for complete search history.

(56) References Cited

U.S. PATENT DOCUMENTS

| | | | | |
|---|---|---|---|---|
| 7,496,594 B1* | 2/2009 | Cummings | ............. | G06F 9/451 |
| | | | | 717/121 |
| 9,329,854 B2* | 5/2016 | Davoudian | ............. | G06F 8/658 |
| 2006/0112173 A1* | 5/2006 | Cohn | ...................... | G06F 3/067 |
| | | | | 707/E17.032 |
| 2012/0204149 A1* | 8/2012 | Joukov | ............... | G06F 11/3051 |
| | | | | 717/121 |
| 2013/0238768 A1* | 9/2013 | Vaidya | .................... | H04L 67/14 |
| | | | | 709/220 |
| 2024/0272914 A1* | 8/2024 | Ma | ...................... | G06F 11/1469 |

* cited by examiner

*Primary Examiner* — Md I Uddin
(74) *Attorney, Agent, or Firm* — Buckley, Maschoff & Talwalkar LLC

(57) ABSTRACT

A system and method include determination of a source tenant system, determination of a target tenant system, determination of target configuration data associated with the target tenant system, comparison of the source configuration data and the target configuration data to identify similar configuration data and dissimilar configuration data, and presentation a first hierarchy of the source configuration data and a second hierarchy of the target configuration data along with indicators of the similar configuration data and the dissimilar configuration data.

17 Claims, 19 Drawing Sheets

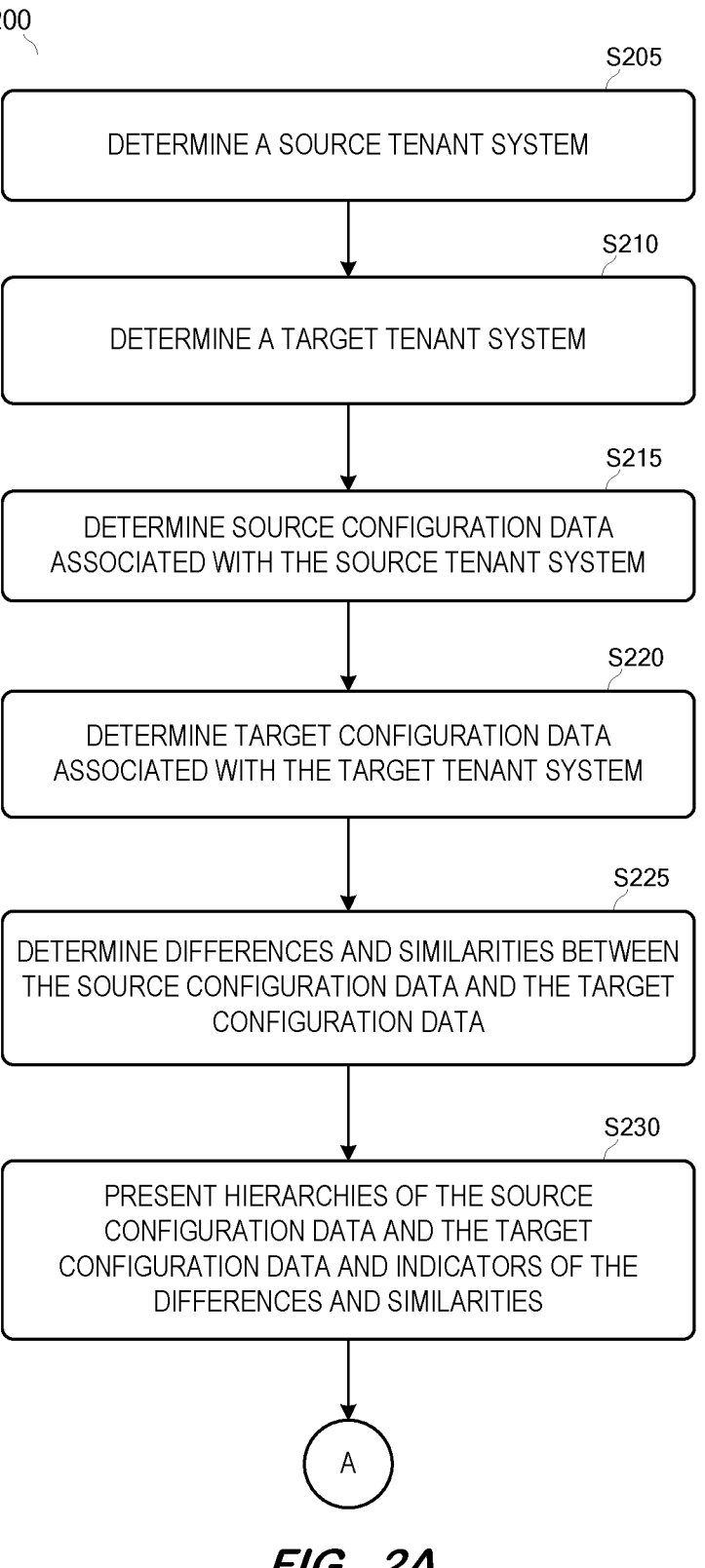

200

S205

DETERMINE A SOURCE TENANT SYSTEM

S210

DETERMINE A TARGET TENANT SYSTEM

S215

DETERMINE SOURCE CONFIGURATION DATA
ASSOCIATED WITH THE SOURCE TENANT SYSTEM

S220

DETERMINE TARGET CONFIGURATION DATA
ASSOCIATED WITH THE TARGET TENANT SYSTEM

S225

DETERMINE DIFFERENCES AND SIMILARITIES BETWEEN
THE SOURCE CONFIGURATION DATA AND THE TARGET
CONFIGURATION DATA

S230

PRESENT HIERARCHIES OF THE SOURCE
CONFIGURATION DATA AND THE TARGET
CONFIGURATION DATA AND INDICATORS OF THE
DIFFERENCES AND SIMILARITIES

Manage Configuration    400

Source Tenant: DTRM01
Target Tenant: DTRM05

Submit

Source Tenant 415

| Node | Type | Description |
|---|---|---|
| ∨ DTRM01 | Plant | |
| DEFAULT | Resource Type | Default Resource Type |
| > ASSYBENCHS | Resource Type | Assembly Benches |
| > TORQUETOOLS | Resource Type | Torque Tools |
| > SPRAYBOOTHS | Resource Type | Spray Booths |
| > ARCWELDERS | Resource Type | ARC Welders |
| > TIRECHANGERS | Resource Type | Tire Changers |
| > LIGHTTESTERS | Resource Type | Light Testers |
| > ECUPROGRAMMER | Resource Type | ECU Programmer |
| > TESTERS | Resource Type | Testing Resources |
| > INSPECTION | Resource Type | Inspection Resources |
| > REPAIRBENCH | Resource Type | Repair Bench |
| > RT_TEST01 | Resource Type | Test resource type |
| > PM_TEST01 | Resource Type | Test resource type |
| > WI-1 | Work Instruct... | WI- Work Instruction 1 |
| WI-FORKLIFT-ASSY | Work Instruct... | WI- Forklift Assembly |

Target Tenant

Transfer    Reset    Delete    Compare    Where-Used

| Node | Type | Description |
|---|---|---|
| ∨ DTR| > TESTERS | Resource Type | Testing Resource |
| DEFAULT | Resource Type | Default Resource Type |
| > SPRAYBOOTHS | Resource Type | Spray Booths |
| > WC-FRAME | Work Center | Frame Work Center  417 |
| > WC-LIGHT | Work Center | Light Work Center |
| > WC-TEST | Work Center | Testing Work Center |
| > TIRECHANGERS | Resource Type | Tire Changers |
| > REPAIRBENCH | Resource Type | Repair Bench |
| > ARCWELDERS | Resource Type | ARC Welders |
| > WI-1 | Work Instruct... | WI- Work Instruction 1 |

Manage Configuration

Source Tenant: DTRM01

Target Tenant: DTRM05

Submit

Source Tenant

| Node | Type | Description |
|---|---|---|
| ˅ DTRM01 | Plant | |
| DEFAULT | Resource Type | Default Resource Type |
| > ASSYBENCHS | Resource Type | Assembly Benches |
| > TORQUETOOLS | Resource Type | Torque Tools |
| > SPRAYBOOTHS | Resource Type | Spray Booths |
| > ARCWELDERS | Resource Type | ARC Welders |
| > TIRECHANGERS | Resource Type | Tire Changers |
| > LIGHTTESTERS | Resource Type | Light Testers |
| > ECUPROGRAMMER | Resource Type | ECU Programmer |
| > TESTERS | Resource Type | Testing Resources |
| > INSPECTION | Resource Type | Inspection Resources |
| > REPAIRBENCH | Resource Type | Repair Bench |
| > RT_TEST01 | Resource Type | Test resource type |
| > PM_TEST01 | Resource Type | Test resource type |
| > WI-1 | Work Instruct... | WI- Work Instruction 1 |
| WI-FORKLIFT-ASSY | Work Instruct... | WI- Forklift Assembly |

Transfer  Reset  Delete  Compare  Where-Used

424

Target Tenant

| Node | Type | Description |
|---|---|---|
| ˅ DTRM05 | Plant | |
| DEFAULT | Resource Type | Default Resource Type |
| > SPRAYBOOTHS | Resource Type | Spray Booths |
| > WC-FRAME | Work Center | Frame Work Center |
| > WC-LIGHT | Work Center | Light Work Center |
| > WC-TEST | Work Center | Testing Work Center |
| > TIRECHANGERS | Resource Type | Tire Changers |
| > REPAIRBENCH | Resource Type | Repair Bench |
| > ARCWELDERS | Resource Type | ARC Welders |
| ˅ TESTERS | Resource Type | Testing Resources |
| T-STATION-1 | Resource | Test Station 1 |
| T-STATION-2 | Resource | Test Station 2 |
| T-STATION-3 | Resource | Test Station 3 |
| T-STATION-4 | Resource | Test Station 4 |

Manage Configuration

Source Tenant:    DTRM01

Target Tenant:    DTRM05

Submit

Source Tenant

| Node | Type | Description |
|---|---|---|
| ⌄ DTRM01 | Plant | |
| DEFAULT | Resource Type | Default Resource Type |
| › ASSYBENCHS | Resource Type | Assembly Benches |
| › TORQUETOOLS | Resource Type | Torque Tools |
| › SPRAYBOOTHS | Resource Type | Spray Booths |
| › ARCWELDERS | Resource Type | ARC Welders |
| › TIRECHANGERS | Resource Type | Tire Changers |
| › LIGHTTESTERS | Resource Type | Light Testers |
| › ECUPROGRAMMER | Resource Type | ECU Programmer |
| › TESTERS | Resource Type | Testing Resources |
| › INSPECTION | Resource Type | Inspection Resources |
| › REPAIRBENCH | Resource Type | Repair Bench |
| › RT_TEST01    418 | Resource Type | Test resource type |
| › PM_TEST01 | Resource Type | Test resource type |

Transfer  Reset  Delete  Compare  Where-Used

Target Tenant

| Node | Type | Description |
|---|---|---|
| ⌄ DTRM05 | Plant | |
| DEFAULT | Resource Type | Default Resource Type |
| › SPRAYBOOTHS | Resource Type | Spray Booths |
| › WC-FRAME | Work Center | Frame Work Center |
| › WC-LIGHT | Work Center | Light Work Center |
| › WC-TEST | Work Center | Testing Work Center |
| › TIRECHANGERS | Resource Type | Tire Changers |
| › REPAIRBENCH | Resource Type | Repair Bench |
| › TESTERS | Resource Type | Testing Resources |
| › ARCWELDERS | Resource Type | ARC Welders |
| › WI-1 | Work Instruct... | WI- Work Instruction 1 |
| 425 | | |

FIG. 9

Figure 10:
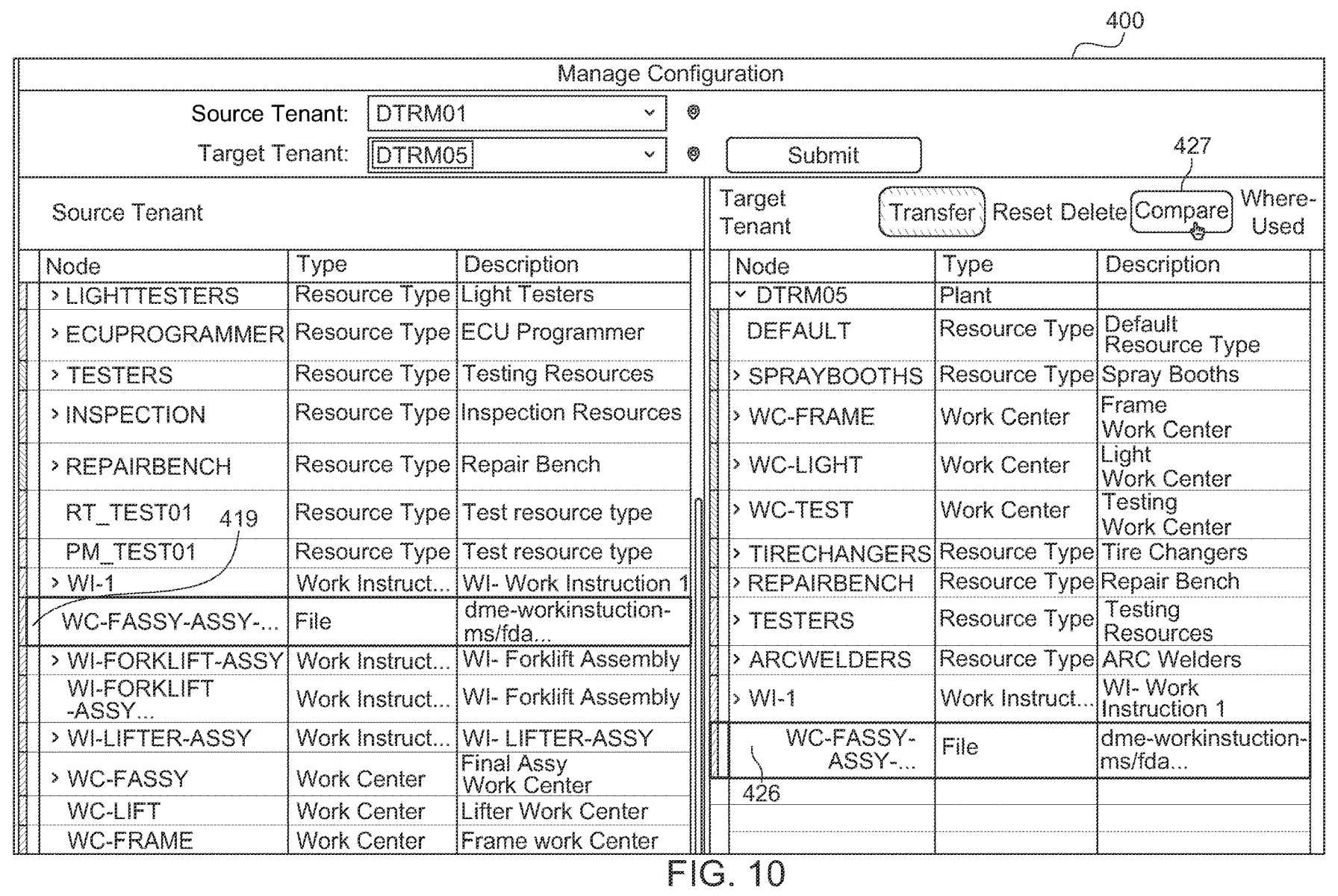

Manage Configuration — 400

Source Tenant: DTRM01

Target Tenant: DTRM05

Submit

Transfer | Reset | Delete | Compare | Where-Used — 427

Source Tenant

| Node | Type | Description |
|---|---|---|
| > LIGHTTESTERS | Resource Type | Light Testers |
| > ECUPROGRAMMER | Resource Type | ECU Programmer |
| > TESTERS | Resource Type | Testing Resources |
| > INSPECTION | Resource Type | Inspection Resources |
| > REPAIRBENCH | Resource Type | Repair Bench |
| RT_TEST01  419 | Resource Type | Test resource type |
| PM_TEST01 | Resource Type | Test resource type |
| > WI-1 | Work Instruct... | WI- Work Instruction 1 |
| WC-FASSY-ASSY-... | File | dme-workinstuction-ms/fda... |
| > WI-FORKLIFT-ASSY | Work Instruct... | WI- Forklift Assembly |
| WI-FORKLIFT-ASSY... | Work Instruct... | WI- Forklift Assembly |
| > WI-LIFTER-ASSY | Work Instruct... | WI- LIFTER-ASSY |
| > WC-FASSY | Work Center | Final Assy Work Center |
| WC-LIFT | Work Center | Lifter Work Center |
| WC-FRAME | Work Center | Frame work Center |

Target Tenant

| Node | Type | Description |
|---|---|---|
| > DTRM05 | Plant | |
| DEFAULT | Resource Type | Default Resource Type |
| > SPRAYBOOTHS | Resource Type | Spray Booths |
| > WC-FRAME | Work Center | Frame Work Center |
| > WC-LIGHT | Work Center | Light Work Center |
| > WC-TEST | Work Center | Testing Work Center |
| > TIRECHANGERS | Resource Type | Tire Changers |
| > REPAIRBENCH | Resource Type | Repair Bench |
| > TESTERS | Resource Type | Testing Resources |
| > ARCWELDERS | Resource Type | ARC Welders |
| > WI-1 | Work Instruct... | WI- Work Instruction 1 |
| WC-FASSY-ASSY-... | File | dme-workinstuction-ms/fda... |

Manage Configuration

Source Tenant: DTRM01
Target Tenant: DTRM05

Submit

Transfer  Reset Delete Compare    Where-Used 400    429    428

Source Tenant

| Node | Type | Description |
|---|---|---|
| DTRM01 | Plant | |
| DEFAULT | Resource Type | Default Resource Type |
| ASSYBENCHS | Resource Type | Assembly Benches |
| TORQUETOOLS | Resource Type | Torque Tools |
| SPRAYBOOTHS | Resource Type | Spray Booths |
| ARCWELDERS | Resource Type | ARC Welders |
| TIRECHANGERS | Resource Type | Tire Changers |
| LIGHTTESTERS | Resource Type | Light Testers |
| ECUPROGRAMMER | Resource Type | ECU Programmer |
| TESTERS | Resource Type | Testing Resources |
| INSPECTION | Resource Type | Inspection Resources |
| REPAIRBENCH | Resource Type | Repair Bench |
| RT_TEST01 | Resource Type | Test resource type |
| PM_TEST01 | Resource Type | Test resource type |
| WI-1 | Work Instruct... | WI - WorkInstruction 1 |
| WC-FASSY-ASSY-... | File | dme-workinstruction-ms/fda... |

Target Tenant

| Node | Type | Description |
|---|---|---|
| DTRM01 | Plant | |
| DEFAULT | Resource Type | Default Resource Type |
| SPRAYBOOTHS | Resource Type | Spray Booths |
| WC-FRAME | Work Center | Frame Work Center |
| WC-LIGHT | Work Center | Light Work Center |
| WC-TEST | Work Center | Testing Work Center |
| TIRECHANGERS | Resource Type | Tire Changers |
| REPAIRBENCH | Resource Type | Repair Bench |
| TESTERS | Resource Type | Testing Resources |
| ARCWELDERS | Resource Type | ARC Welders |
| ARCWELD-1 | Resource | Arc Welder-1 |
| ARCWELD-2 | Resource | Arc Welder-2 |
| ARCWELD-3 | Resource Type | Arc Welder-3 |
| ARCWELD-4 | Resource | Arc Welder-4 |
| ARCWELD-5 | Resource | Arc Welder-5 |
| WC-1 | Work Instruct... | WI - Work Instruction 1 |

FIG. 12

CONFIGURATION TRANSPORT BETWEEN TENANTS

BACKGROUND

Modern organizations conduct transactions using database systems. In a typical organization, a computing system landscape consists of independent parallel database systems, or tenants. These systems may include a productive tenant which conducts customer transactions based on received customer requests, one or more development tenants, and one or more test tenants. Each of these tenants may be, for example, separate tenants on single database system, or separate single-tenant database systems.

Typically, an organization installs an off-the-shelf database system on the development tenant and configures the system on the development tenant according to its needs. The configuration data may describe logical entities associated with the organization. In the case of a manufacturing-related database system, the configuration data may describe employees, tools, machines and activities of a manufacturing plant. Creation of the configuration data within a tenant may require tens of person-workdays.

Once the configuration is completed on the development tenant, the configuration data is deployed to the test tenant for testing. If the results of the testing are satisfactory, the configuration data is deployed to the productive tenant. The productive tenant may then operate to receive and service incoming customer requests. In addition to the foregoing scenarios, it may be desirable to create configuration data within one development tenant based on the configuration data of another development tenant, or to create configuration data within one productive tenant based on the configuration data of another productive tenant. Systems are therefore desired to create configuration data within one (i.e., target) tenant based on configuration of another (i.e., source) tenant.

Each of the above scenarios requires manual creation of the configuration data, which again may require tens of person-workdays and is also error-prone. Systems are therefore desired to facilitate the creation of configuration data within a tenant based on the configuration data of another tenant. Such systems may also facilitate comparison between existing configuration data of the two tenants.

BRIEF DESCRIPTION OF THE DRAWINGS

FIGS. 2A and 2B comprise a flow diagram of a process to transport configuration data between tenants according to some embodiments.

FIG. 7 is a user interface for managing the transport of configuration data between tenants according to some embodiments.

FIG. 8 is a user interface for managing the transport of configuration data between tenants according to some embodiments.

FIG. 9 is a user interface for managing the transport of configuration data between tenants according to some embodiments.

FIG. 10 is a user interface for initiating a comparison of configuration data according to some embodiments.

FIG. 12 is a user interface for invoking a where-used function with respect to selected configuration data according to some embodiments.

DETAILED DESCRIPTION

The following description is provided to enable any person in the art to make and use the described embodiments. Various modifications, however, will be readily-apparent to those in the art.

Some embodiments provide acquisition and presentation of source configuration data associated with a source tenant system and target configuration data associated with a target tenant system. The source configuration data and the target configuration data may be presented in a hierarchical format, and in conjunction with indicators identifying similar configuration data and dissimilar configuration data. For example, a first type of indicator may be presented adjacent to first source configuration data to indicate that the target tenant system includes configuration data identical to the first source configuration data, and a second type of indicator may be presented adjacent to second source configuration data to indicate that the target system does not include configuration data associated with an entity of the second source configuration data. In some embodiments, a third type of indicator may be presented adjacent to third source configuration data to indicate that the target tenant system includes configuration data associated with an entity of the third source configuration data, but that the third source configuration data is not identical to the configuration data of the target system which is associated with the entity of the third source configuration data.

Embodiments may further provide a user interface to facilitate selection of source configuration data to be transferred to a target tenant system, and initiation of the transfer. Upon initiation, the selected source configuration data may be bundled into object instances such as JavaScript Object Notation instances or may be created in the target tenant system by calling appropriate application programming interfaces of the target tenant system.

Figure 1:
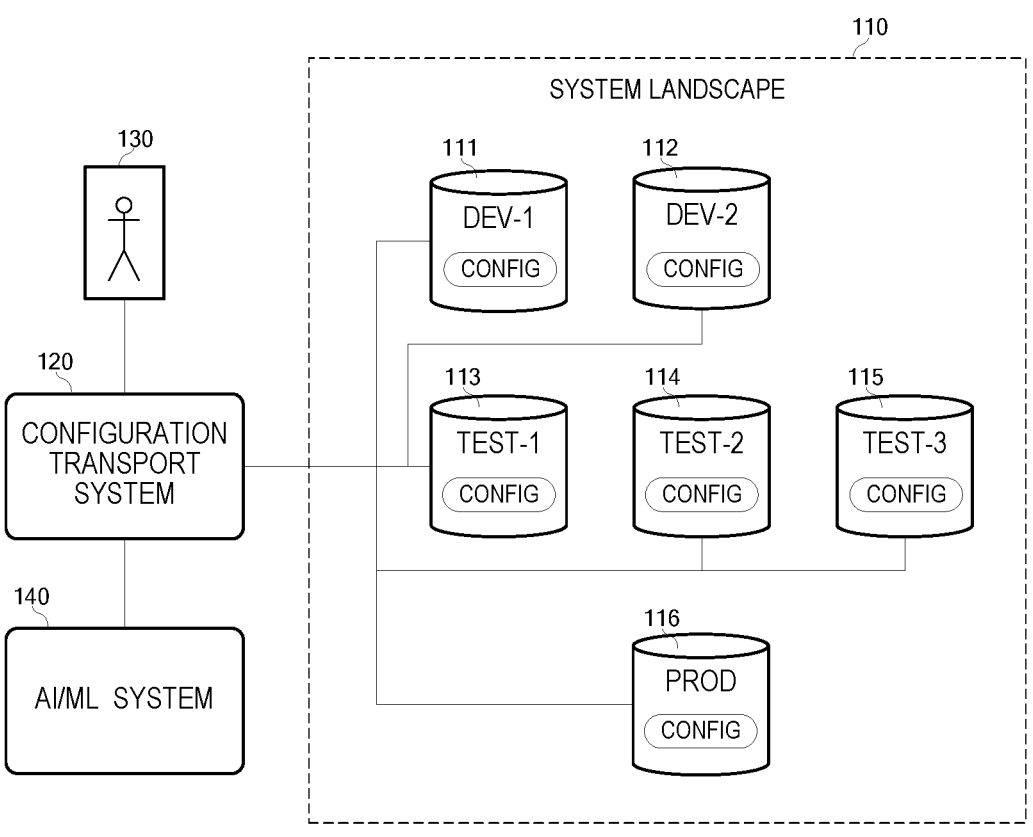
FIG. 1 illustrates an architecture including a configuration transport system in communication with tenants of a system landscape according to some embodiments.

FIG. 1 illustrates an architecture according to some embodiments. Each of the illustrated components of FIG. 1 may be implemented using any suitable combinations of computing hardware and/or software that are or become known. Such combinations may include cloud-based implementations in which computing resources are virtualized and allocated elastically. In some embodiments, two or more components are implemented by a single computing device.

System landscape 110 may be operated by an organization or on behalf of an organization to provide functionality to the organization and/or its customers. Landscape 110 includes development tenants 111, 112, test tenants 113-115 and productive tenant 116. System landscape 110 may include more or fewer tenants of each type, other types of tenants, and any other components as are known in the art, including but not limited to services, applications, data stores, proxies, redundancies, and availability zones.

Each development tenant, test tenant and productive tenant of system landscape 110 may comprise a separate database system and any two or more of development tenants 111, 112, test tenants 113-115 and productive tenant 116 may be implemented by a single multi-tenant database system. The database systems may be implemented using any database technology that is or becomes known. Embodiments are not limited to a particular database type, implementation, hardware, and/or software.

In some examples, the database systems may be on-premise, cloud-based, distributed (e.g., with distributed storage and/or compute nodes) and/or deployed in any other suitable manner. Each database system may comprise disparate cloud-based services, a single computer server, a cluster of servers, and any other combination that is or becomes known. All or a part of each database system may utilize Infrastructure-as-a-Service (IaaS), Platform-as-a-Service (PaaS) and/or Software-as-a-Service (SaaS) offerings owned and managed by one or more different entities as is known in the art.

In order to deploy a tenant system, an operator of system landscape 110 installs a database system thereon. The database system may be a general- or specific-purpose database system and may include pre-configured data within templates provided by a developer of the database system. Regardless of the pre-configured data, the operator is typically required to define certain configuration data (e.g., depicted as "config" in FIG. 1) within the tenant system in order to align its database system with the needs of the organization. Configuration data may specify operational parameters such as currency, fiscal year, applicable accounting rules, and expense aggregation format, and may describe logical entities associated with the organization. For example, the configuration data may define resource types and resources of each resource type. Resource types may include employment positions, types of tools, types of machines, types of activities and types of instructions but embodiments are not limited thereto. Deployment also typically includes generation of master data such as, for example, customer names, supplier details, product information, and material information.

Configuration transport system 120 is in communication with each tenant system of system landscape 110, either directly or indirectly via one or more networks and/or other components. Configuration transport system 120 may receive instructions from operator 130 to acquire and present configuration data from one or more tenant systems of system landscape 110. Configuration transport system 120 may also receive instructions to transfer configuration data from one tenant of system landscape 110 to another tenant of system landscape 110, and may execute such a transfer in response. Other functions of configuration transport system 120 will be described below, including functions which utilize calls to Artificial Intelligence/Machine Learning (AI/ML) system 140.

AI/ML system 140 may comprise any of one or more types of machine learning-compatible network, algorithm, decision tree, Large Language Model, etc., that is or becomes known. Generally, system 140 may comprise a network of nodes which receive input, change internal state according to that input, and produce output depending on the input and internal state. The output of certain nodes is connected to the input of other nodes to form a directed and weighted graph. The weights are modified during training using learning algorithms as is known in the art.

Figure 2B:
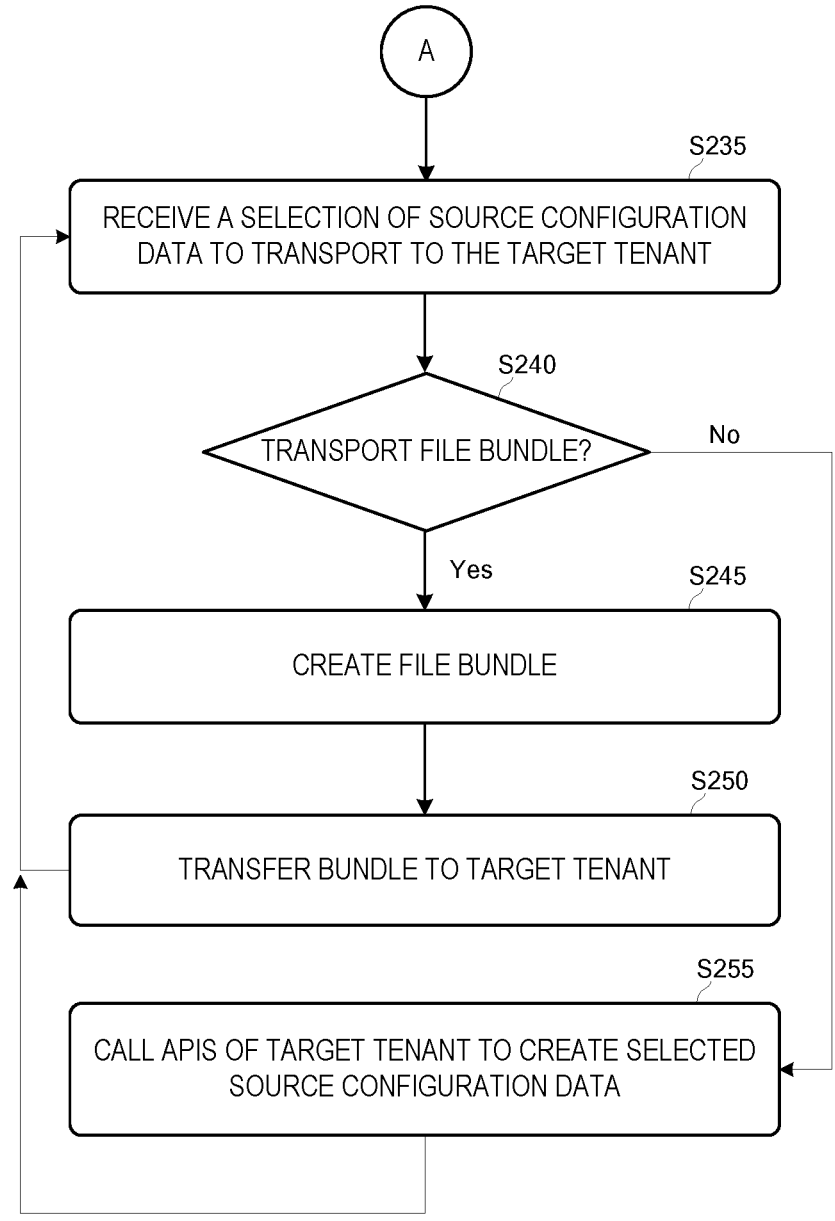

FIGS. 2A and 2B comprise a flow diagram of process 200 to transport configuration data between tenants according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, at S205, a source tenant system is determined. The source tenant system may be determined based on input received from an operator. In particular, an operator may manipulate a user interface provided by configuration transport system 120 to specify a source tenant system from which configuration data is to be transferred. Similarly, a target tenant system is determined at S210. The target tenant system may be determined based on input received from an operator, such as manipulation of a user interface provided by configuration transport system 120 to specify a target tenant system to which configuration data is to be transferred.

Figure 3:
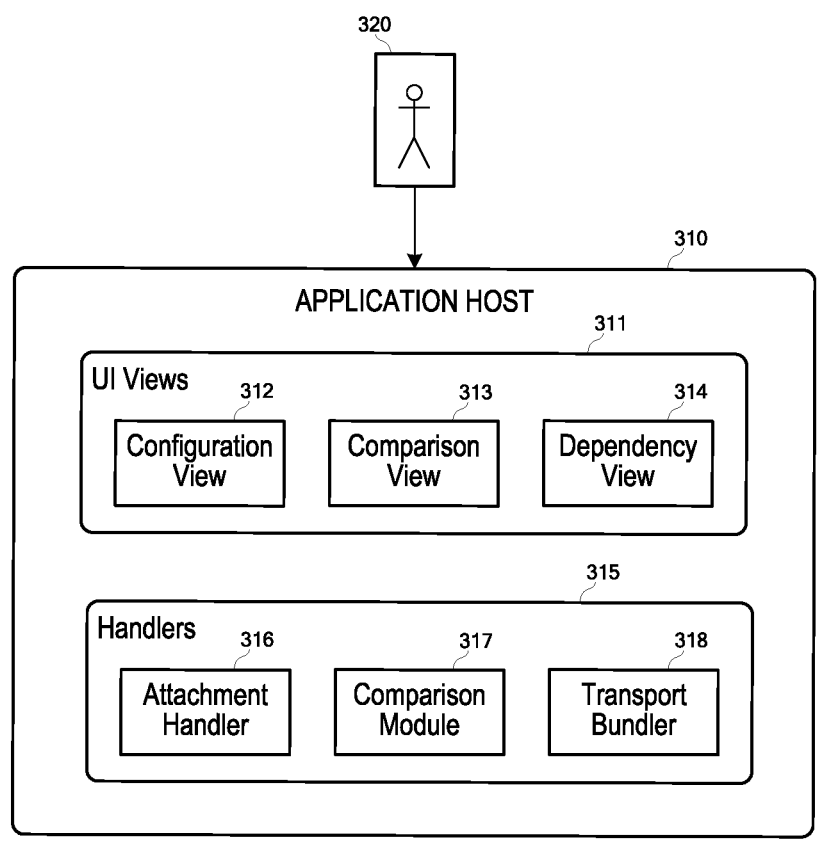
FIG. 3 is a block diagram of components of a configuration transport system according to some embodiments.

FIG. 3 is a detailed block diagram of components of a configuration transport system according to some embodiments. The components include program code of user interface (UI) views 311 and of handlers 315 stored and executable by application host 310, which may comprise a computer server. A configuration transport system may comprise a sub-component of a larger tenant management application providing functionality in addition to that described herein. In such a case, UI views 311 and handlers 315 may include more components than illustrated in FIG. 3. Embodiments are not limited to a view-handler software architecture.

Figure 4:
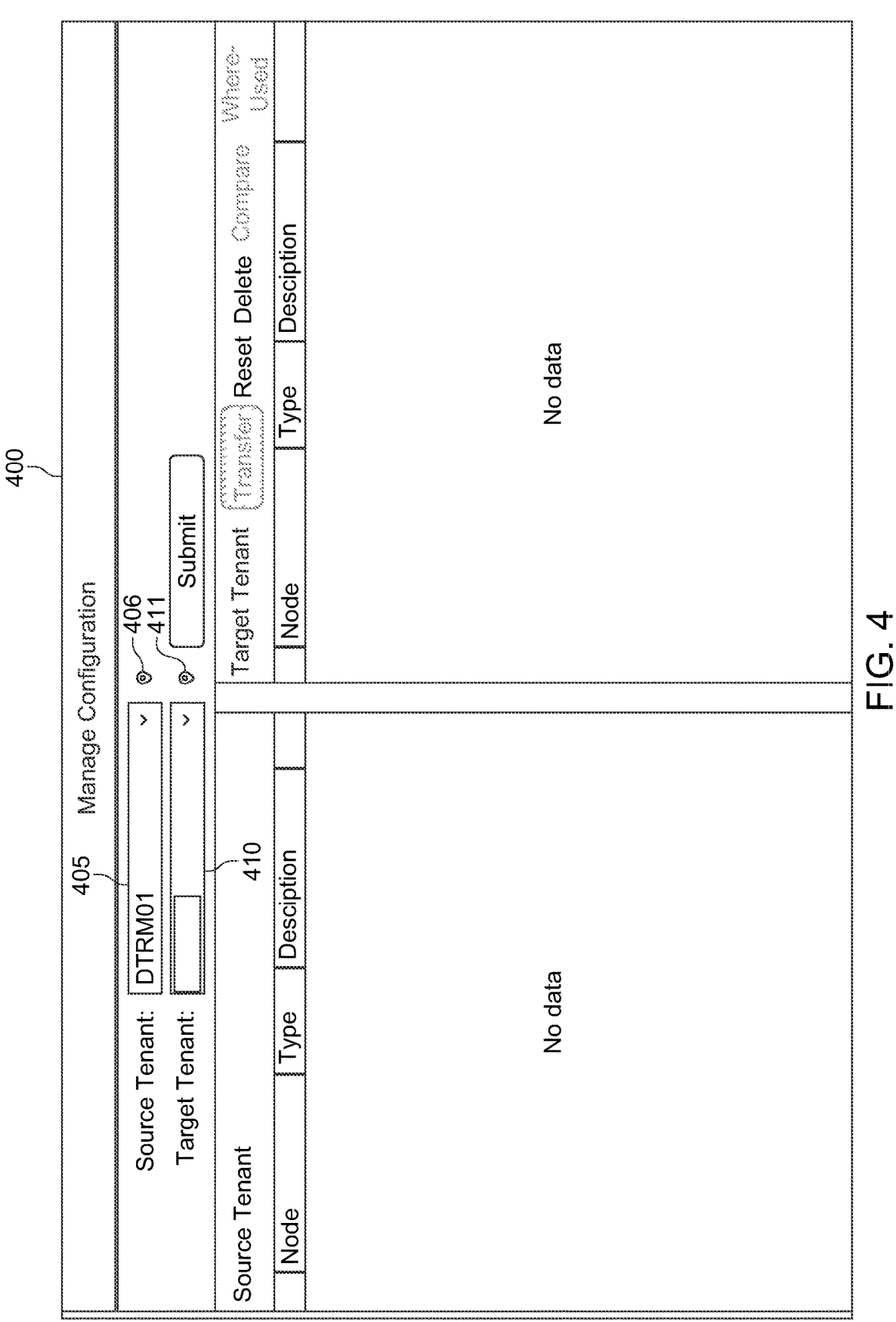
FIG. 4 is a user interface for managing the transport of configuration data between tenants according to some embodiments.

In some examples of S205 and S210, operator 320 communicates with application host 310 to access configuration view component 312 and to specify a source tenant system and a target tenant system via configuration view component 312. FIG. 4 illustrates user interface 400 accessed by operator 320 at S205 according to some embodiments. A computing system operated by operator 320 may execute a Web browser to access user interface 400.

User interface 400 includes drop-down fields 405 and 410 for specifying a source tenant system (e.g., "DTRM01") and a target tenant system ("DTRM05"), respectively. Operator 320 may interact with drop-down fields 405 and 410 to view tenant systems available for selection and select a tenant system for each of fields 405 and 410. The tenant systems available for selection in each of fields 405 and 410 may comprise the tenant systems of system landscape 110, and may be determined by configuration view component 312 via calls to system landscape 110. Any of tenant systems 111-116 may be selected within user interface 400 as either a source tenant system or a target tenant system according to some embodiments.

Any type of input UI control may be used to specify the source tenant system and the target tenant system in some embodiments. According to one non-exhaustive example, drop-down field 405 is associated with location icon 406 and drop-down field 410 is associated with location icon 411. An operator may select either of location icons 406 and 411 to select a corresponding source or target tenant system using a map.

Figure 5:
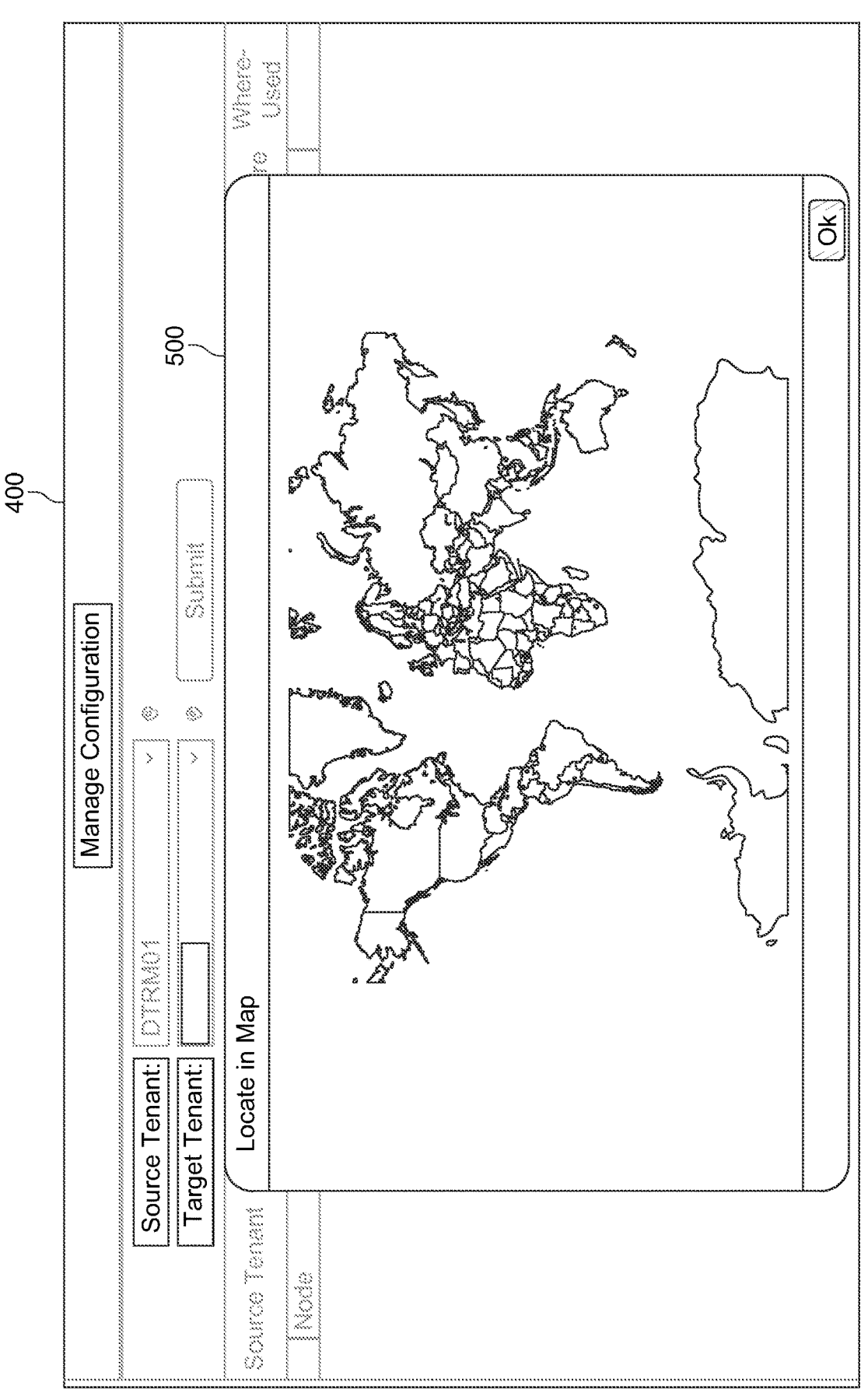
FIG. 5 is a user interface for managing the transport of configuration data between tenants according to some embodiments.
Figure 6:
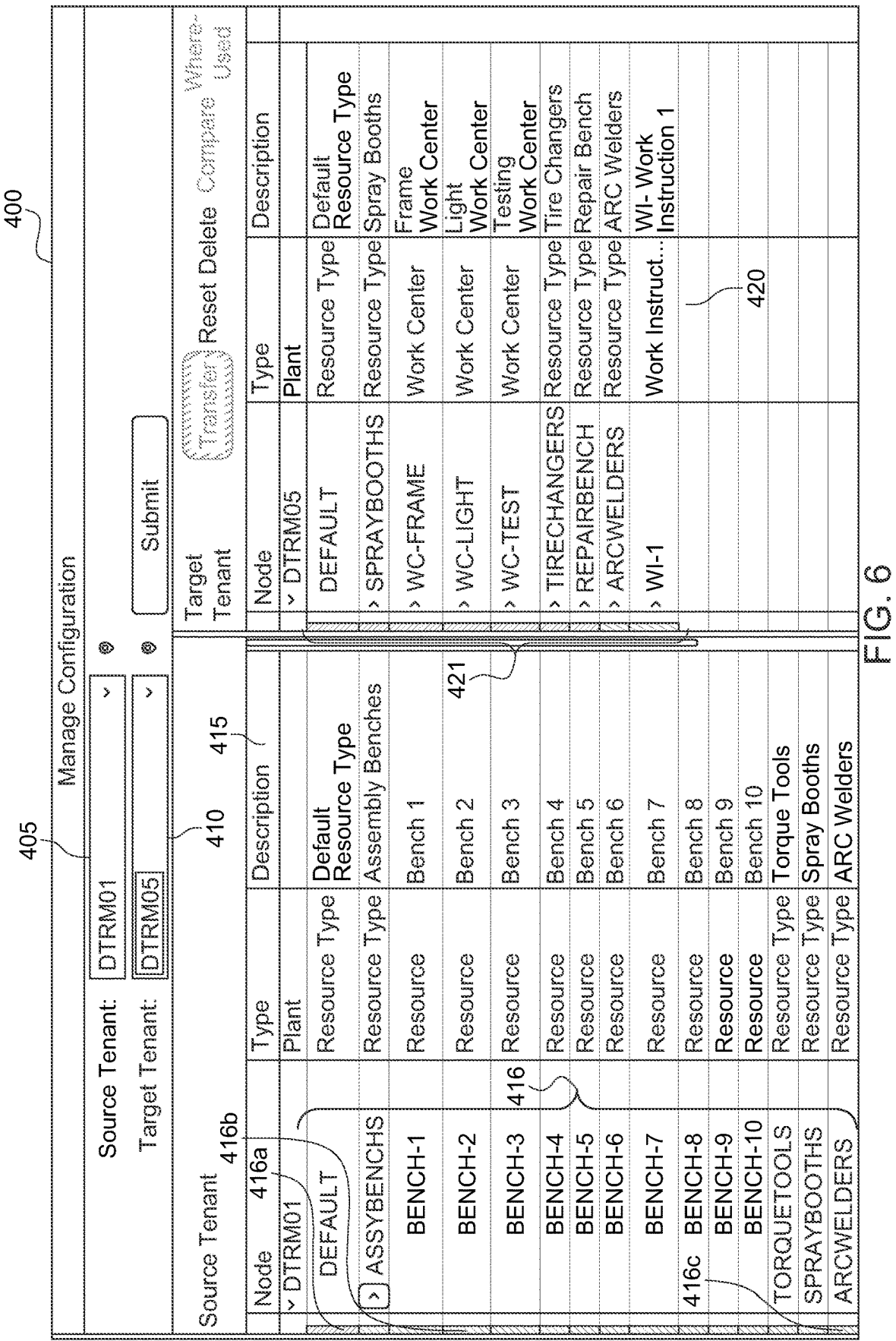
FIG. 6 is a user interface for managing the transport of configuration data between tenants according to some embodiments.

For example, selection of icon 411 may result in display of map 500 of FIG. 5. Map 500 is overlaid on user interface 400 but embodiments are not limited thereto. According to some embodiments, an operator may zoom in or out on map 500 to locate a target tenant system and to select the target tenant system. Drop-down field 410 is then populated with the thusly-selected target tenant system as shown in FIG. 6.

Returning to process 200, source configuration data associated with the determined source tenant system is determined at S215. Determination of the source configuration data may comprise querying the source tenant system for its stored configuration data. In some embodiments, configuration view component 312 queries the source tenant system. Configuration transport system 120 may therefore have access to endpoint and authentication information associated with each of tenants 111-116. Similarly, target configuration data associated with the determined target tenant system is determined at S220.

Differences and similarities between the source configuration data and the target configuration data are determined at S225. For example, configuration data may include data describing types of resources as well as metadata describing instances of each resource type. S225 may comprise determining, for each resource and resource type of the source configuration data, whether a corresponding resource or resource type exists in the target configuration data. If a corresponding resource or resource type exists in the target configuration data, S225 may further include determining whether the corresponding resources or resource types are identical.

Next, at S230, hierarchies of the source configuration data and the target configuration data are presented. Also presented at S230 are indicators of the differences and similarities determined at S225. The hierarchies and indicators may be presented using configuration view component 312 of UI views 311. FIG. 6 illustrates interface 400 presenting hierarchies of source configuration data and target configuration data and indicators according to some embodiments of S230.

In one example, area 415 of interface 400 presents a hierarchy of source configuration data of the source tenant system specified in field 405. Each row represents configuration data of a resource type or a resource. Area 420 similarly presents a hierarchy of target configuration data of the target tenant system specified in field 410. The row representing the configuration data of each resource type is associated with an expand/collapse control which may be selected to view or hide the resources associated with the resource type. Area 415 presents a resource type ASSYB-ENCHS, which has been expanded to present ten resources of the resource type.

Indicators 416 and 421 are presented to indicate differences and similarities between the source configuration data and the target configuration data. A first type of indicator (e.g., indicator 416a) is presented adjacent to a row of the source configuration data to indicate that a corresponding resource or resource type exists in the target configuration data, and that the corresponding target configuration data is identical to the source configuration data. A second type of indicator (e.g., indicator 416b) is presented adjacent to a row of the source configuration data to indicate that a corresponding resource or resource type does not exist in the target configuration data the target tenant system. Finally, a third type of indicator (e.g., indicator 416c) is presented adjacent to a row of the source configuration data to indicate that a corresponding resource or resource type exists in the target configuration data, and that the corresponding target configuration data is not identical to the source configuration data.

Embodiments may support the transport of configuration data using drag-and-drop functionality. This functionality may be provided by configuration view component 312. FIG. 7 illustrates operator selection, using a mouse, of the presented TESTERS resource type row from area 415 and "dragging" of the row 417 to area 420. FIG. 8 shows the row after being "dropped" into area 420. The row has been expanded to show four resources of the resource type. Since the configuration data of the dropped rows has not yet been transported to the target tenant system, indicators 422 presented adjacent to the dropped rows (and the indicator 421 presented adjacent to the TESTERS resource type row of area 415) are of the first type described above.

It is now assumed that Transfer control 424 is selected while the rows which were dropped into area 420 are selected. This selection is received at S235 of process 200. In response, it is determined at S240 whether to transport the selected source configuration data as a file bundle. The determination at S240 may be based on the memory size or other measure of the amount of the source configuration data to be transferred. For example, if the amount of source configuration data to be transferred exceeds a threshold, it is determined at S240 to transport the source configuration data as a file bundle.

Assuming the determination at S240 is positive, a file bundle is created based on the selected source configuration data at S245. The file bundle may be created by transport bundler 318 of handlers 315 in some embodiments. Creation of the file bundle may comprise conversion of the selected configuration data into a single object (or bundle), such as but not limited to a JavaScript Object Notation (JSON) object.

The file bundle is transferred to the target tenant system at S250. Transport bundler 318 may transfer the bundle by calling an appropriate API of the target tenant system and attaching the file bundle as a payload to the call. In some embodiments, the file bundle is created as multiple objects, in which case each objects may be transferred at S250 via separate calls and/or payloads.

Flow proceeds to S255 if it is determined at S240 to not transport the selected source configuration data as a file bundle. At S255, the selected source configuration is created directly in the target tenant system by calling configuration data creation APIs provided by the target tenant system. For example, transport system 120 may call an API of test tenant system 114 to request creation in the configuration data of system 114 of a Tester resource type having the same attribute values as the Tester resource type of the source configuration data. Transport system 120 may similarly call the same or another API of test tenant system 114 to request creation in the configuration data of system 114 of four resources of the Tester resource type having the same attribute values as the corresponding resources of the selected source configuration data.

FIG. 9 illustrates interface 400 after transfer of the selected source configuration data to the target tenant system. Indicators 418 and 425 indicate that the new configuration data of the target tenant system is identical to the source configuration data which was selected for transfer. According to some embodiments, flow may return to S235 from S250 and S255 to receive a selection of other source configuration data to transfer to the target tenant system.

Some embodiments may provide functionality in addition to that described above. FIG. 10 illustrates selection of source configuration data 419 associated with a file resource of resource type Work Instructions, and selection of target configuration data 426 associated with an identically-named file resource of resource type Work Instructions. Also depicted is operator selection of Compare control 427.

Figure 11:
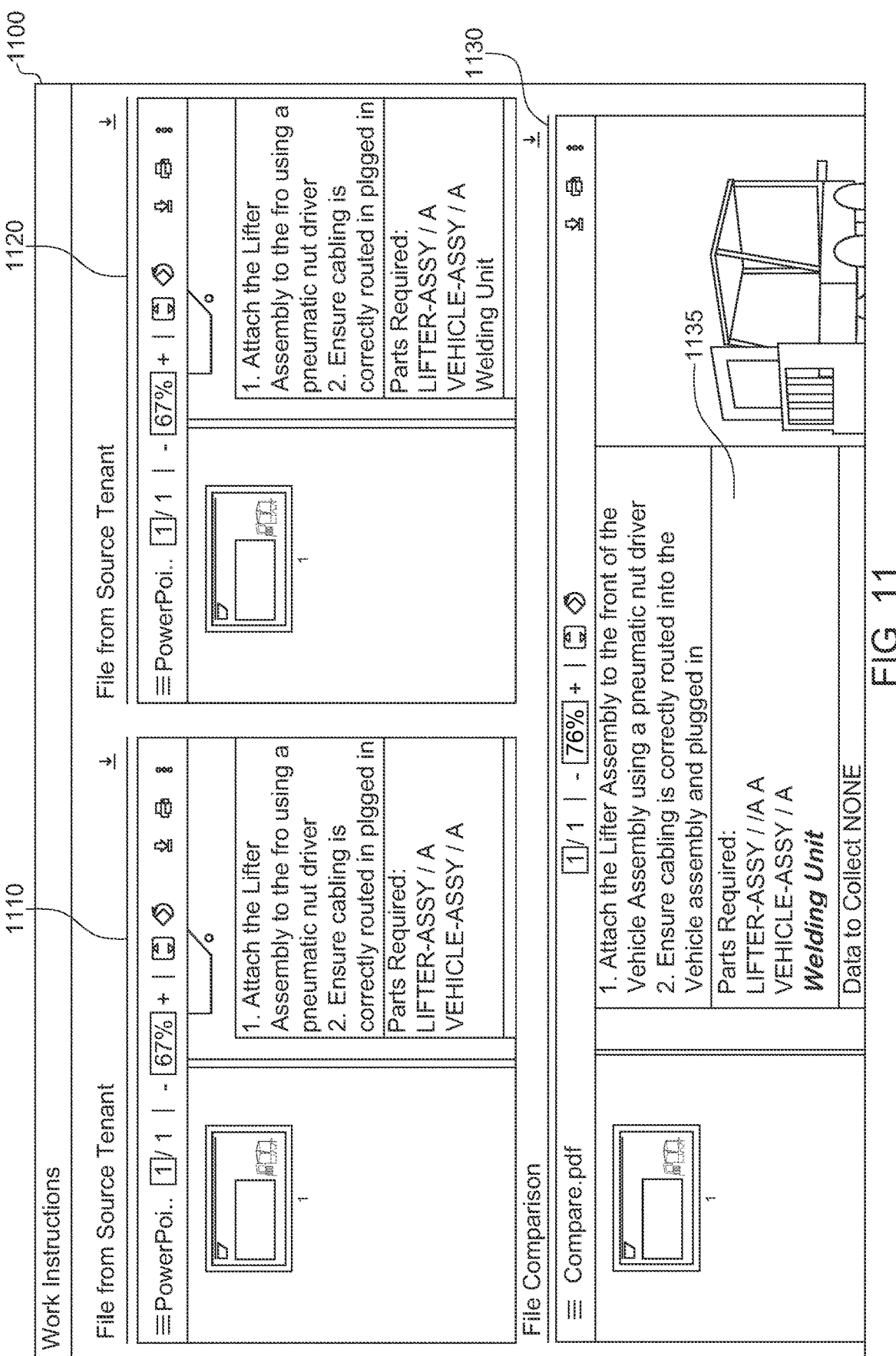
FIG. 11 is a user interface for illustrating differences between configuration data according to some embodiments.

Interface 1100 of FIG. 11 may be presented in response to selection of Compare control 427. Interface 1100 includes window 1110 to present the resource described by selected source configuration data 419 and window 1120 to present the resource described by selected target configuration data 426. Comparison window 1130 presents differences between the two resources.

According to some embodiments, the comparison is performed by opening each resource using a suitable attachment handler 316 and converting the resources to a format suitable for comparison (e.g., text, text and images, text and video). The converted resources are passed to comparison view component 317, which executes to identify any differences between the resources. The identified differences, as well as the original resources, may be presented to operator 320 via comparison view component 317 as depicted in FIG. 11.

Figure 13:
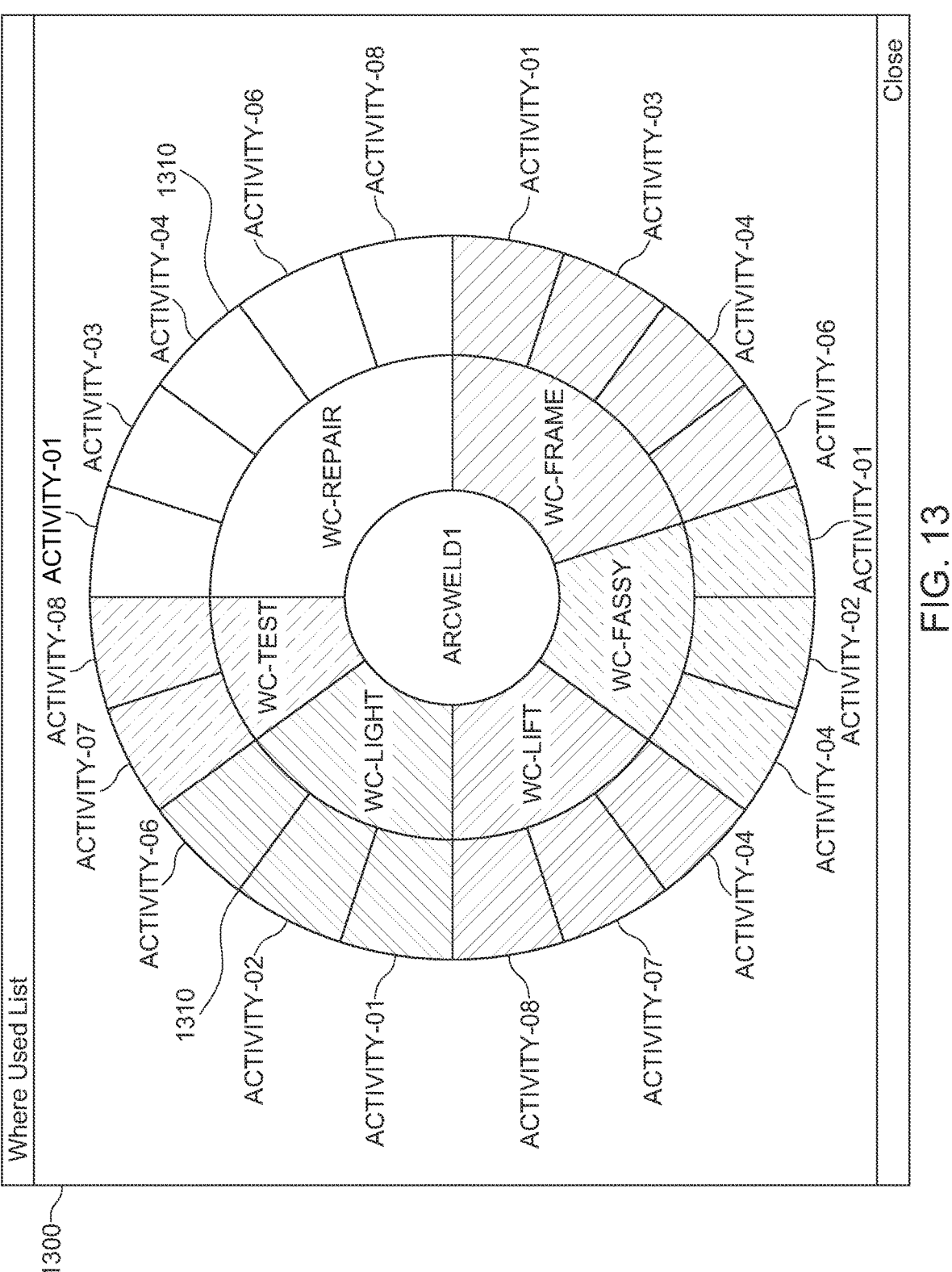
FIG. 13 is a user interface presenting dependencies between configuration data according to some embodiments.
Figure 14:
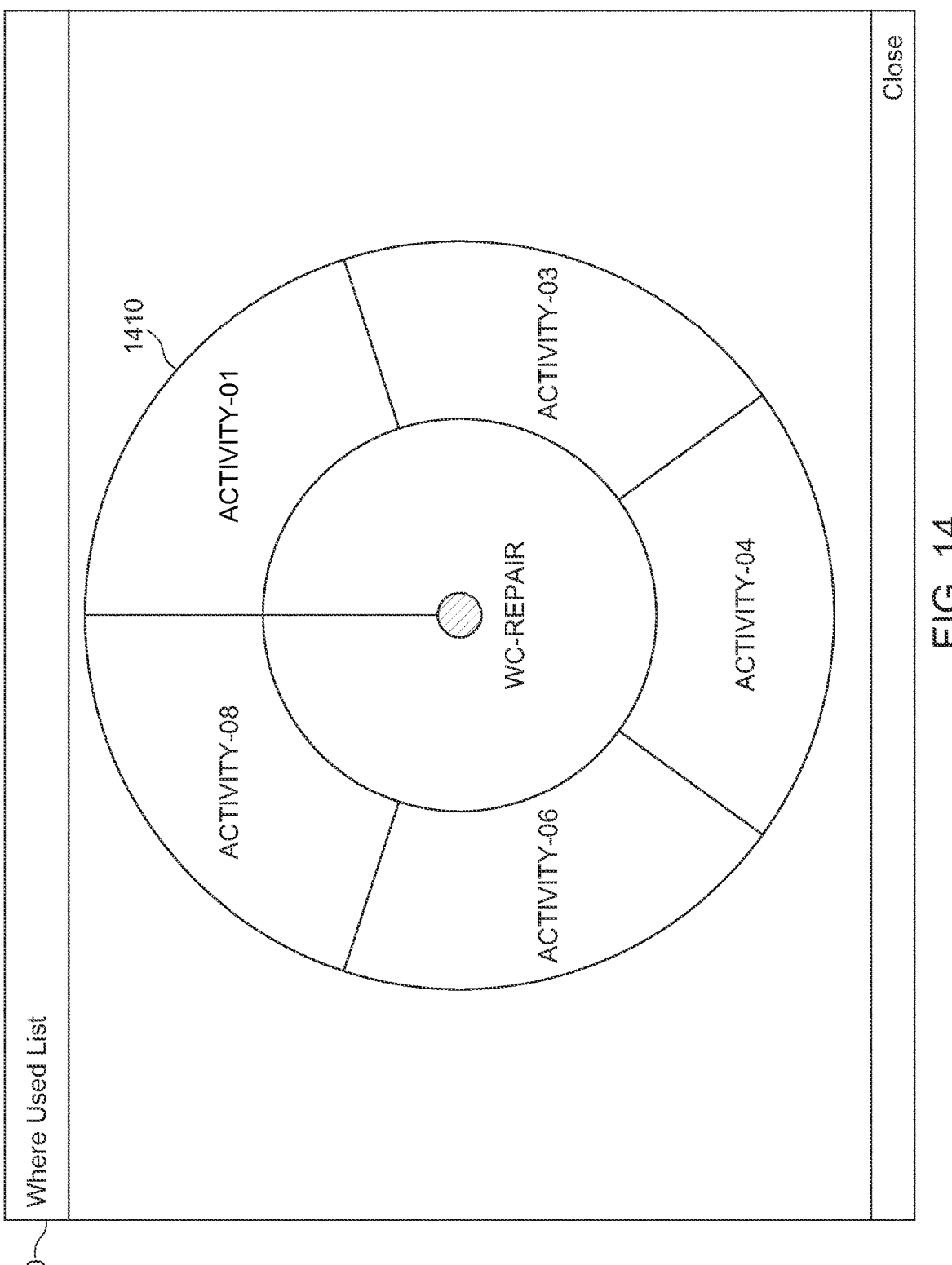
FIG. 14 is a user interface presenting dependencies between configuration data according to some embodiments.

FIG. 12 illustrates selection of target configuration data of resource 428 and selection of Where-Used control 429. Such selection, in some embodiments, results in presentation of window 1300 of FIG. 13. Window 1300 includes graphic 1310 in which the innermost circle represents the selected resource, a next innermost circle indicates resources which are associated with (e.g., use or otherwise include a reference to) the selected resource, and the outermost circle indicates resources which are associated with the associated resources. It will be assumed that an operator selects the area of graphic 1310 associated with resource WC-Repair. In response, graphic 1410 of FIG. 14 is presented, in which the innermost circle represents the resource WC-Repair and the outermost circle indicates resources which are associated with the resource WC-Repair.

According to some embodiments, dependency view component 314 generates graphics 1310 and 1410 based on an index generated based on the configuration data of each selected tenant system. The index may be generated in the background upon selection of a tenant system in interface 400. Embodiments are not limited to the format of graphic 1310 and graphic 1410.

Figure 15:
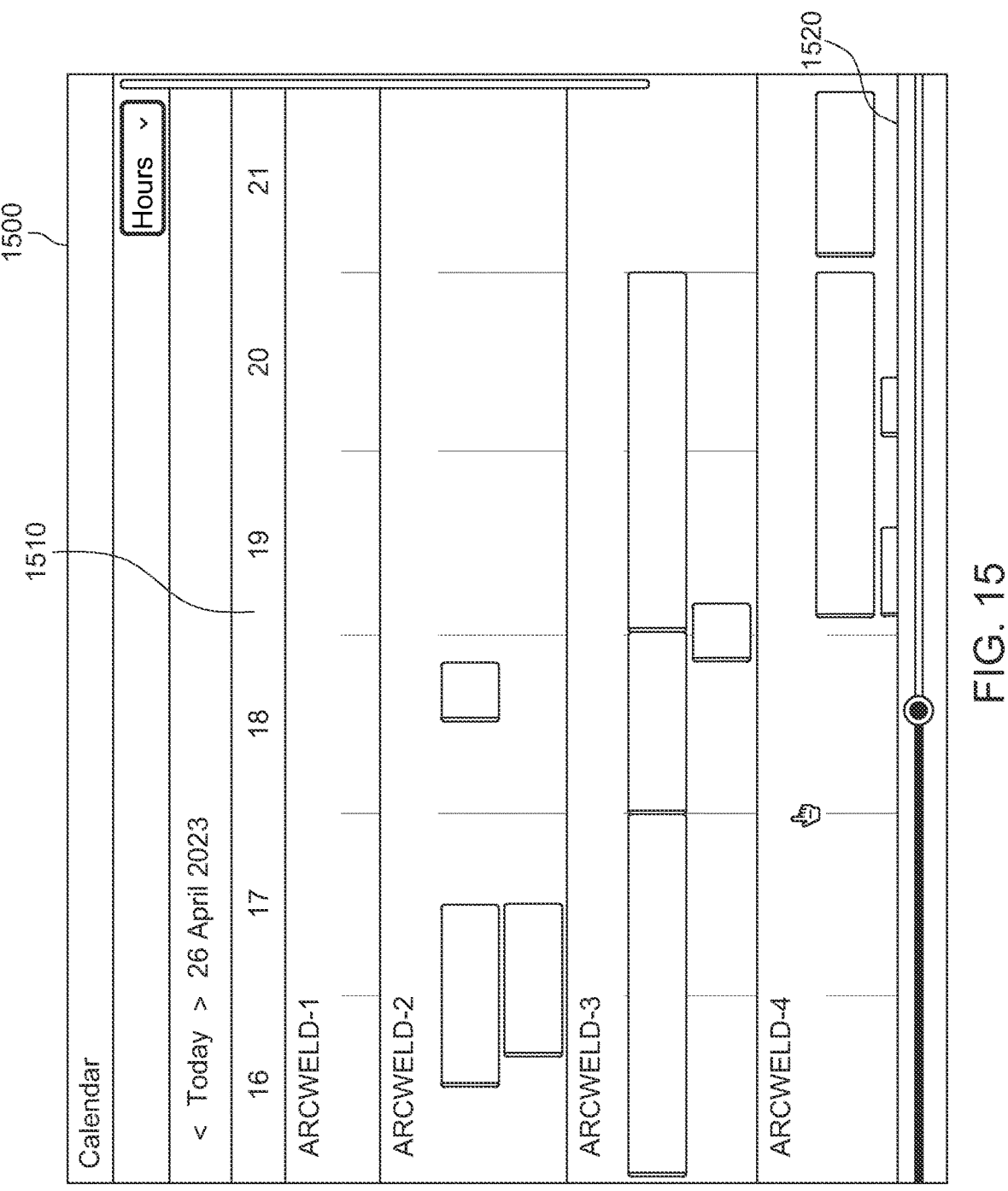
FIG. 15 is a user interface illustrating resource schedules according to some embodiments.

FIG. 15 illustrates scheduling interface 1500 according to some embodiments. Interface 1500 may be invoked by dragging a resource to the highest-level configuration data (e.g., the row representing the entire tenant system) of a presented hierarchy. Interface 1500 shows, for each resource of the same type as the dragged resource, time periods during which the resources are scheduled to be in use. These time periods may be determined from the configuration data of each of the resources.

Figure 16:
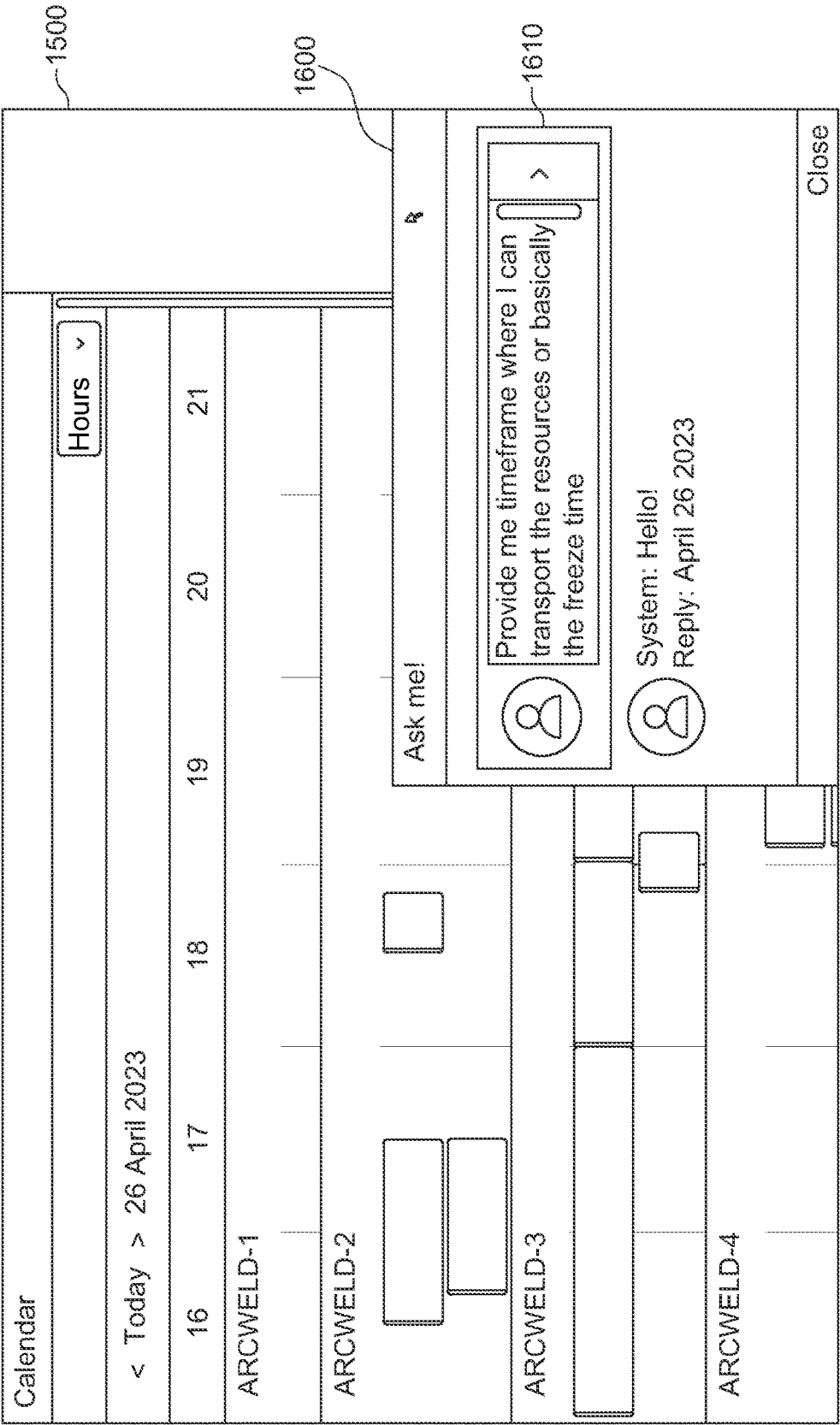
FIG. 16 shows a chat interface for submitting inquiries and receiving responses according to some embodiments.
Figure 17:
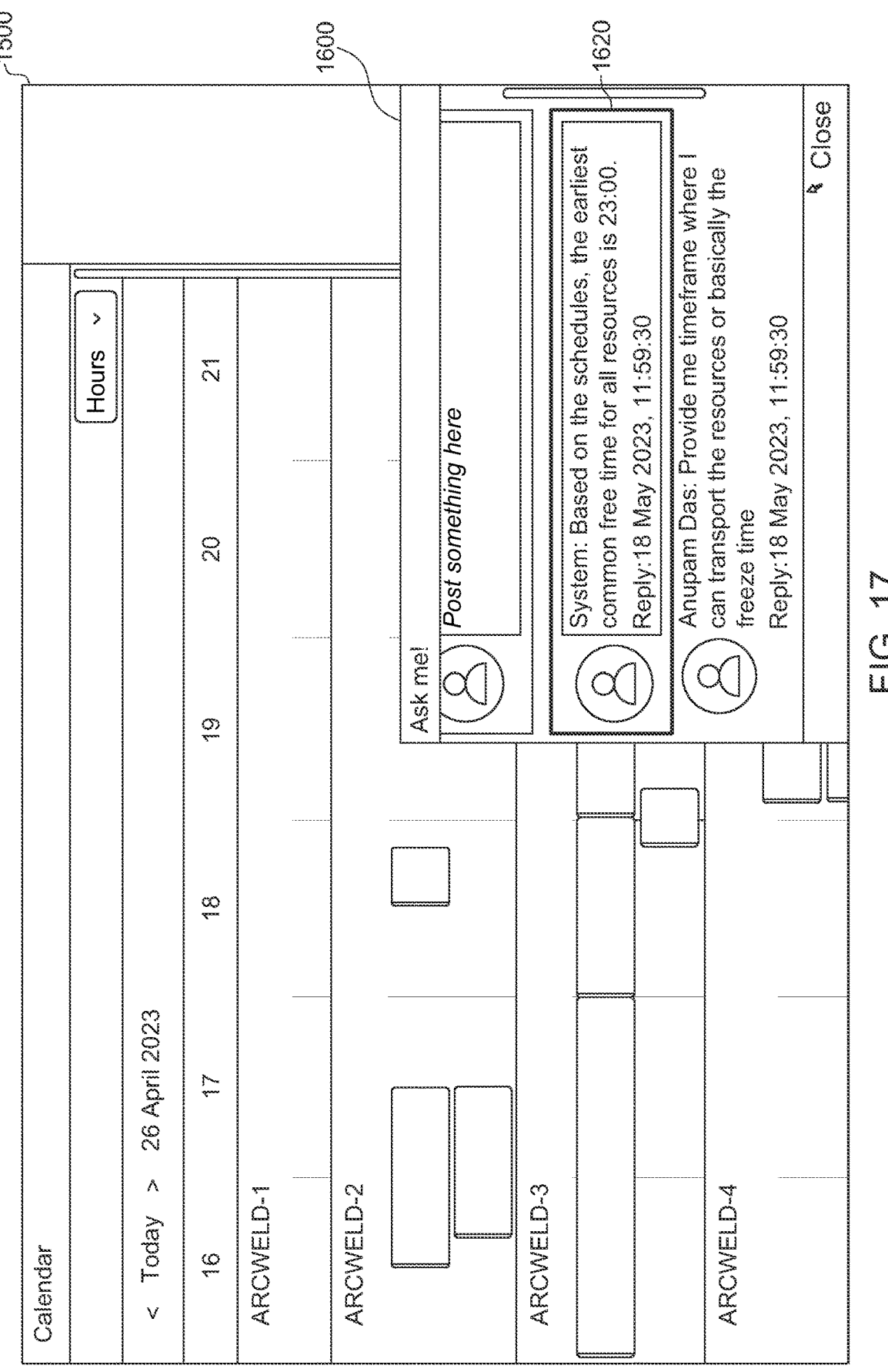
FIG. 17 shows a chat interface for submitting inquiries and receiving responses according to some embodiments.

Interface 1500 also includes Ask Me control 1520. Selection of control 1520 causes display of chat window 1600 of FIG. 16. An operator has entered a natural language query into input area 1610. In some embodiments, the query is transmitted to AI/ML system 140 and a response such as response 1620 of FIG. 17 is returned. The scheduling data of each resource, and any other suitable data, may be transmitted to system 140 along with the query.

Figure 18:
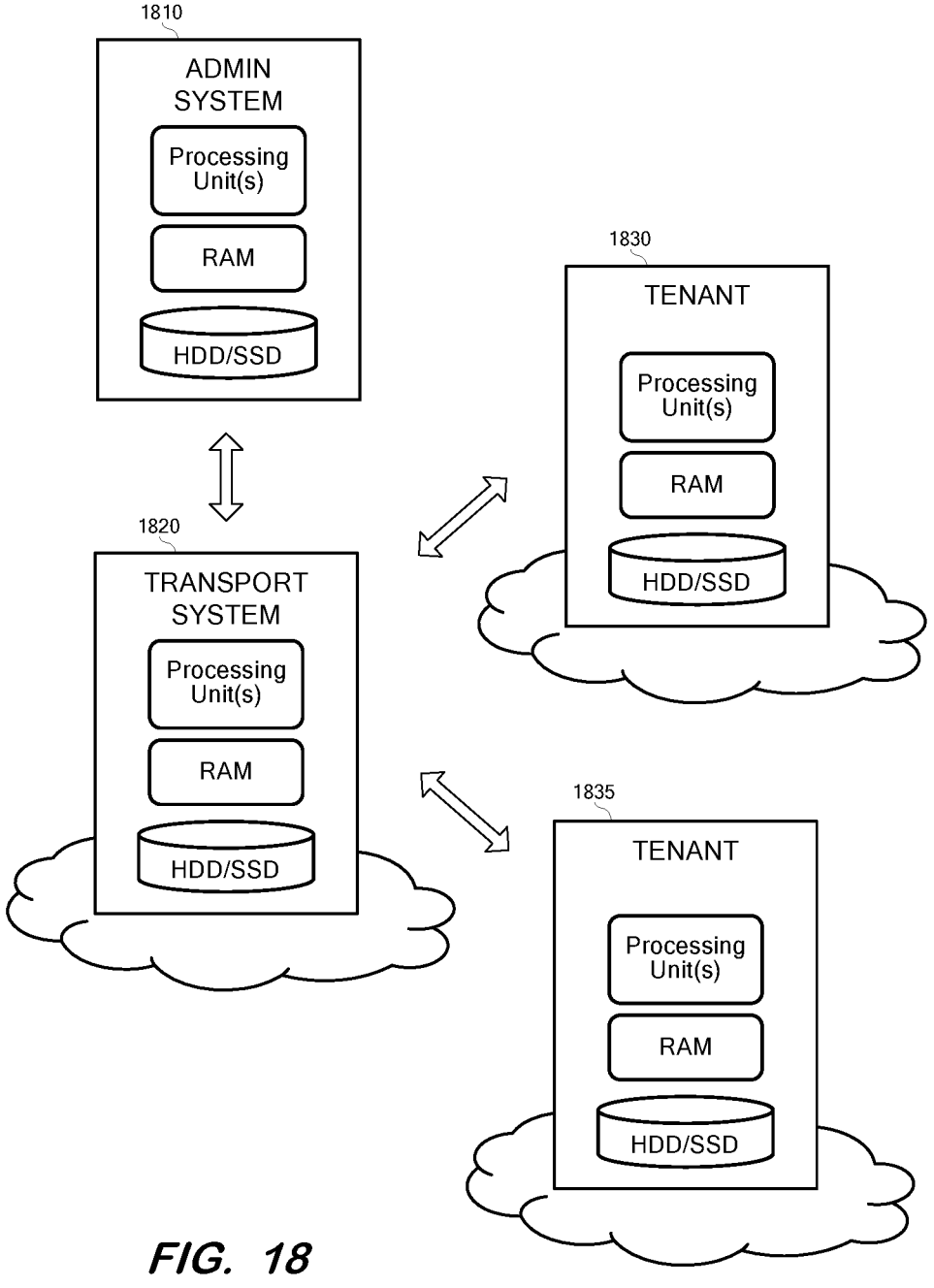
FIG. 18 is a diagram of a cloud-based implementation according to some embodiments.

FIG. 18 is a diagram of a cloud-based implementation according to some embodiments. Administrator system 1810 may comprise a local computing system operated by an operator as described above. Transport system 1820 may comprise an application host which operates as described herein to transport configuration data between tenants 1830 and 1830. Each of tenants 1830 and 1835 may comprise a database system of a system landscape.

Each of systems 1820-1835 may comprise cloud-based resources residing in one or more public clouds providing self-service and immediate provisioning, autoscaling, security, compliance and identity management features. Systems 1820-1835 may comprise servers or virtual machines of respective Kubernetes clusters, but embodiments are not limited thereto.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable recording media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:
1. A system comprising:
a memory storing processor-executable program code; and
at least one processing unit to execute the processor-executable program code to cause the system to:
determine a source tenant system;
determine a target tenant system;
determine source configuration data associated with the source tenant system;
determine target configuration data associated with the target tenant system;
compare the source configuration data and the target configuration data to identify similar configuration data and dissimilar configuration data;
present a first hierarchy of the source configuration data and a second hierarchy of the target configuration data along with indicators of the similar configuration data and the dissimilar configuration data;

receive a selection of a subset of the source configuration data;

in response to the received selection, call a plurality of application programming interfaces of the target tenant system to create only the selected subset of the source configuration data in the target tenant system;

receive a selection of a second subset of the source configuration data to transport to the target tenant system;

determine to transport the second subset of the source configuration data as a bundle; and in response to the determination to transport the second subset of the source configuration data as a bundle, transport the second subset of the source configuration data to the target tenant system as a bundle.

2. A system according to claim 1, wherein transport of the second subset of the source configuration data as a bundle comprises:

conversion of the second subset of the source configuration data into JavaScript Object Notation format; and transport of the converted second subset of the source configuration data to the target tenant system.

3. A system according to claim 1, the at least one processing unit to execute the processor-executable program code to cause the system to:

determine to not transport the selected subset of the source configuration data as a bundle; and in response to the determination to not transport the selected subset of the source configuration data as a bundle, call the plurality of application programming interfaces of the target tenant system to create the selected subset of the configuration data in the target tenant system.

4. A system according to claim 1, wherein the presented first hierarchy of the source configuration data comprises a plurality of source resource types and, for each of the plurality of source resource types, one or more source resources, wherein the presented second hierarchy of the target configuration data comprises a plurality of target resource types and, for each of the plurality of target resource types, one or more target resources, and wherein the presented indicators comprise a first type of indicator presented adjacent to a source resource type of the source configuration data which is identical to a target resource type of the target configuration data, and a second type of indicator presented adjacent to a source resource type of the source configuration data which does not exist as a target resource type in the target configuration data.

5. A system according to claim 4, wherein the presented indicators comprise a third type of indicator presented adjacent to a source resource type of the source configuration data which exists as a target resource type in the target configuration data but which is not identical to the existing target resource type of the target configuration data.

6. A system according to claim 5, wherein the first type of indicator is presented adjacent to a target resource type of the target configuration data which exists in the source configuration data as a source resource type, and wherein the third type of indicator is presented adjacent to a target resource type of the target configuration data which exists as a source resource type in the source configuration data but which is not identical to the existing source resource type of the source configuration data.

7. A method comprising:

determining a source tenant system;

determining a target tenant system;

determining source configuration data associated with the source tenant system;

determining target configuration data associated with the target tenant system;

comparing the source configuration data and the target configuration data to identify similar configuration data and dissimilar configuration data;

presenting a first hierarchy of the source configuration data and a second hierarchy of the target configuration data along with indicators of the similar configuration data and the dissimilar configuration data;

receiving a selection of a subset of the source configuration data;

in response to the received selection, calling a plurality of application programming interfaces of the target tenant system to create only the selected subset of the source configuration data in the target tenant system;

receiving a selection of a second subset of the source configuration data to transport to the target tenant system;

determining to transport the second subset of the source configuration data as a bundle; and in response to determining to transport the second subset of the source configuration data as a bundle, transporting the second subset of the source configuration data to the target tenant system as a bundle.

8. A method according to claim 7, further comprising:

determining to not transport the selected subset of the source configuration data as a bundle; and in response to determining to not transport the second subset of the source configuration data as a bundle, calling the plurality of application programming interfaces of the target tenant system to create the selected subset of the source configuration data in the target tenant system.

9. A method according to claim 7, wherein transporting the first source configuration data as a bundle comprises:

converting the second subset of the source configuration data into JavaScript Object Notation format; and transporting the converted second subset of the source configuration data to the target tenant system.

10. A method according to claim 7, wherein the presented first hierarchy of the source configuration data comprises a plurality of source resource types and, for each of the plurality of source resource types, one or more source resources, wherein the presented second hierarchy of the target configuration data comprises a plurality of target resource types and, for each of the plurality of target resource types, one or more target resources, and wherein the presented indicators comprise a first type of indicator presented adjacent to a source resource type of the source configuration data which is identical to a target resource type of the target configuration data, and a second type of indicator presented adjacent to a source resource type of the source configuration data which does not exist as a target resource type in the target configuration data.

11. A method according to claim 10, wherein the presented indicators comprise a third type of indicator presented adjacent to a source resource type of the source configuration data which exists as a target resource type in the target configuration data but which is not identical to the existing target resource type of the target configuration data.

12. A method according to claim 11, wherein the first type of indicator is presented adjacent to a target resource type of the target configuration data which exists in the source configuration data as a source resource type, and wherein the third type of indicator is presented adjacent to a target resource type of the target configuration data which exists as a source resource type in the source configuration data but which is not identical to the existing source resource type of the source configuration data.

13. A non-transitory computer-readable recording medium storing processor-executable program code, the program code executable by a computing system to:

determine a source tenant system;

determine a target tenant system;

determine source configuration data associated with the source tenant system;

determine target configuration data associated with the target tenant system;

compare the source configuration data and the target configuration data to identify similar configuration data and dissimilar configuration data;

present a first hierarchy of the source configuration data and a second hierarchy of the target configuration data along with indicators of the similar configuration data and the dissimilar configuration data;

receive a selection of a subset of the first hierarchy of the source configuration data;

in response to the received selection, call a plurality of application programming interfaces of the target tenant system to create only the selected subset of the source configuration data in the target tenant system;

receive a selection of a second subset of the source configuration data to transport to the target tenant system;

determine to transport the second subset of the source configuration data as a bundle; and in response to the determination to transport the second subset of the source configuration data as a bundle, transport the second subset of the source configuration data to the target tenant system as a bundle.

14. A medium according to claim 13, the program code executable by a computing system to:

determine to not transport the selected subset of the source configuration data as a bundle; and in response to the determination to not transport the selected subset of the source configuration data as a bundle, call the plurality of application programming interfaces of the target tenant system to create the selected subset of the configuration data in the target tenant system.

15. A medium according to claim 13, wherein the presented first hierarchy of the source configuration data comprises a plurality of source resource types and, for each of the plurality of source resource types, one or more source resources, wherein the presented second hierarchy of the target configuration data comprises a plurality of target resource types and, for each of the plurality of target resource types, one or more target resources, and wherein the presented indicators comprise a first type of indicator presented adjacent to a source resource type of the source configuration data which is identical to a target resource type of the target configuration data, and a second type of indicator presented adjacent to a source resource type of the source configuration data which does not exist as a target resource type in the target configuration data.

16. A medium according to claim 15, wherein the presented indicators comprise a third type of indicator presented adjacent to a source resource type of the source configuration data which exists as a target resource type in the target configuration data but which is not identical to the existing target resource type of the target configuration data.

17. A medium according to claim 16, wherein the first type of indicator is presented adjacent to a target resource type of the target configuration data which exists in the source configuration data as a source resource type, and wherein the third type of indicator is presented adjacent to a target resource type of the target configuration data which exists as a source resource type in the source configuration data but which is not identical to the existing source resource type of the source configuration data.

* * * * *